(12) United States Patent
Dhakshinamoorthy et al.

(10) Patent No.: US 10,747,206 B2
(45) Date of Patent: Aug. 18, 2020

(54) INTELLIGENT DATA ACCESS FOR INDUSTRIAL INTERNET OF THINGS DEVICES USING LATENT SEMANTIC INDEXING

(71) Applicant: Honeywell International Inc., Morris Plains, NJ (US)

(72) Inventors: Chandirasekaran Dhakshinamoorthy, Govindasalai (IN); Mahima Bisht, Dehradun (IN); Satheesh Bhuvaneswaran, Chennai (IN); Rodney Stein, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 96 days.

(21) Appl. No.: 16/044,783

(22) Filed: Jul. 25, 2018

(65) Prior Publication Data

US 2019/0107827 A1 Apr. 11, 2019

Related U.S. Application Data

(60) Provisional application No. 62/568,576, filed on Oct. 5, 2017.

(51) Int. Cl.
*G06F 15/16* (2006.01)
*G05B 19/418* (2006.01)
(Continued)

(52) U.S. Cl.
CPC ... *G05B 19/4183* (2013.01); *G06F 16/24522* (2019.01); *G10L 15/26* (2013.01); *H04L 12/2827* (2013.01); *G05B 19/4186* (2013.01)

(58) Field of Classification Search
CPC ............ H04L 29/08072; H04L 29/06; H04L 12/2827; H04L 12/28; G05B 19/4183; G10L 15/26
See application file for complete search history.

(56) References Cited

U.S. PATENT DOCUMENTS 7,412,541 B1 * 8/2008 Stadler .................. H04L 69/04
379/900
7,533,333 B2 * 5/2009 Motoyama .............. H04L 29/06
358/1.15

(Continued)

OTHER PUBLICATIONS

Postol, "Address Space Interchange XML", Manual, CAS, May 2015, 36 pages.

(Continued)

*Primary Examiner* — Razu A Miah

(57) ABSTRACT

A method, an electronic device, and a computer readable medium for vulnerability detection are disclosed. The method includes receiving a request, from a computing device, for data associated with an industrial plant. The method also includes generating a session with the computing device. The method further includes gathering nodes from one or more servers associated with the industrial plant, wherein each of the nodes includes data associated a particular feature of the industrial plant. Additionally the method includes deriving contextual links between the nodes and the received request for data to identify levels of similarity between the nodes and the request for data. The method also includes ranking the nodes based on the identified levels of similarity.

20 Claims, 5 Drawing Sheets

(51) Int. Cl.
   *G10L 15/26* (2006.01)
   *H04L 12/28* (2006.01)
   *G06F 16/2452* (2019.01)

(56) References Cited

U.S. PATENT DOCUMENTS

| | | | | |
|---|---|---|---|---|
| 7,983,892 | B2* | 7/2011 | Anne | G05B 19/0428 |
| | | | | 700/17 |
| 8,140,632 | B1* | 3/2012 | Jablokov | G06Q 30/02 |
| | | | | 709/206 |
| 8,224,988 | B2* | 7/2012 | Kubota | H04L 29/12839 |
| | | | | 709/238 |
| 8,706,831 | B2* | 4/2014 | Massoulie | H04L 67/1076 |
| | | | | 709/212 |
| 9,270,761 | B1* | 2/2016 | Logue | G05B 15/02 |
| 2001/0037397 | A1* | 11/2001 | Boucher | G06F 5/10 |
| | | | | 709/230 |
| 2002/0099799 | A1* | 7/2002 | Kolsky | H04L 29/06 |
| | | | | 709/219 |
| 2004/0133627 | A1* | 7/2004 | Kalyanaraman | |
| | | | | H04L 29/06027 |
| | | | | 709/201 |
| 2004/0162874 | A1* | 8/2004 | Woo | H04L 29/06 |
| | | | | 709/203 |
| 2006/0129676 | A1* | 6/2006 | Modi | H04L 29/12009 |
| | | | | 709/227 |
| 2007/0266117 | A1* | 11/2007 | Pomies | H04L 29/06 |
| | | | | 709/218 |
| 2011/0035287 | A1* | 2/2011 | Fox | G06Q 30/02 |
| | | | | 705/14.69 |
| 2011/0113094 | A1* | 5/2011 | Chunilal | G06Q 10/00 |
| | | | | 709/204 |
| 2011/0264245 | A1* | 10/2011 | Lim | H04L 12/12 |
| | | | | 700/90 |
| 2012/0016678 | A1* | 1/2012 | Gruber | G10L 13/02 |
| | | | | 704/275 |
| 2012/0166610 | A1* | 6/2012 | Doh | H04L 67/12 |
| | | | | 709/223 |
| 2013/0073388 | A1* | 3/2013 | Heath | G06Q 50/01 |
| | | | | 705/14.53 |
| 2013/0080516 | A1* | 3/2013 | Bologh | H04N 21/26216 |
| | | | | 709/203 |
| 2015/0195365 | A1* | 7/2015 | Choi | H04L 67/16 |
| | | | | 715/739 |
| 2015/0241860 | A1* | 8/2015 | Raid | G05B 15/02 |
| | | | | 700/275 |
| 2015/0341227 | A1* | 11/2015 | Tatzel | G06F 16/00 |
| | | | | 715/736 |
| 2015/0350987 | A1* | 12/2015 | Chatterjea | H04W 36/20 |
| | | | | 370/331 |
| 2016/0092157 | A1* | 3/2016 | Kalkere | G05B 15/02 |
| | | | | 700/94 |
| 2016/0165659 | A1* | 6/2016 | Deng | H04L 12/28 |
| | | | | 315/292 |
| 2016/0195861 | A1* | 7/2016 | Chen | G05B 19/418 |
| | | | | 700/275 |
| 2016/0283894 | A1* | 9/2016 | Lee | G06Q 10/10 |
| 2016/0350654 | A1* | 12/2016 | Lee | G06N 3/08 |
| 2017/0006533 | A1* | 1/2017 | Gould | H04L 61/6022 |
| 2017/0026195 | A1* | 1/2017 | Pan | H04L 12/282 |
| 2017/0293696 | A1* | 10/2017 | Bendersky | G06F 16/951 |
| 2017/0357249 | A1* | 12/2017 | Sandler | G05B 19/41835 |
| 2018/0152312 | A1* | 5/2018 | Zheng | H04L 12/2823 |
| 2018/0300437 | A1* | 10/2018 | Thomsen | G06F 17/509 |

OTHER PUBLICATIONS

Postol, "OPC UA Information Model Deployment", Whitepaper, CAS, Aug. 2015, 41 pages.
Postól, "OPC UA Information Model Deployment," Whitepaper, Address Space Model Designer, Release 1.2, CAS, Aug. 2015, 41 pages.
Postól, "Address Space Interchange XML," Manual, Address Space Model Designer, Release 1.1, CAS, May 2015, 36 pages.

* cited by examiner

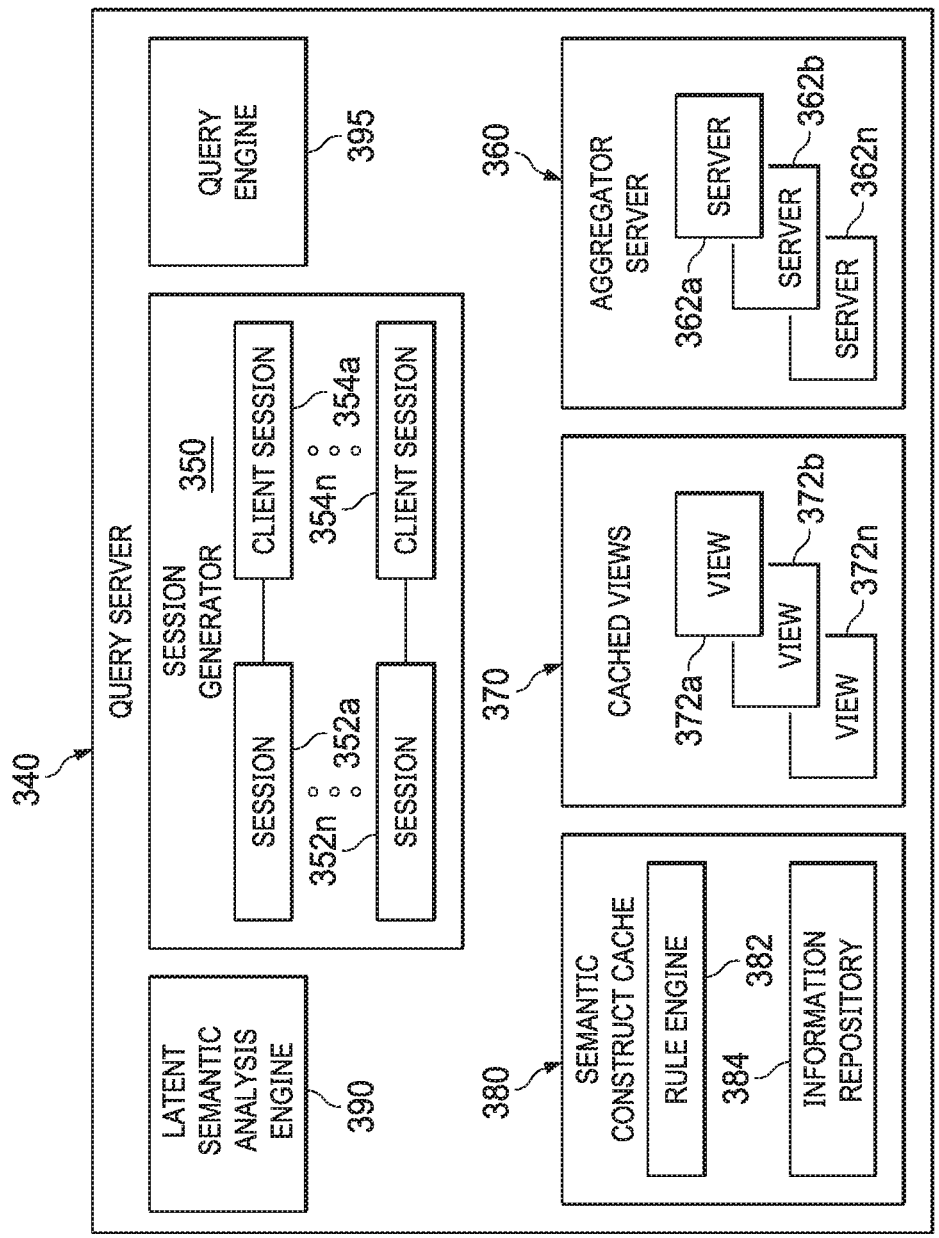

INTELLIGENT DATA ACCESS FOR INDUSTRIAL INTERNET OF THINGS DEVICES USING LATENT SEMANTIC INDEXING

CROSS-REFERENCE TO RELATED APPLICATION AND CLAIM OF PRIORITY

This application claims priority under 35 U.S.C. § 119(e) to U.S. Provisional Patent Application No. 62/568,576 filed on Oct. 5, 2017. The above-identified provisional patent application is hereby incorporated by reference in its entirety.

TECHNICAL FIELD

This disclosure relates generally to connected industrial process control and automation systems. More specifically, this disclosure relates to an apparatus and method for intelligent data access and semantic interworking for industrial internet of things devices using latent semantic indexing.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Measurements, identification information, set points, and other data related to the controllers and field devices may be stored in various devices of a control and automation system. Human operators routinely interact with controllers and other devices in the process control and automation system. Operators of these types of process control and automation systems may request data related to the various process controllers and field devices. Operators may use this information, for example, to track the status of the controllers and field devices and to decide whether changes to the control and automation systems or the underlying industrial processes should be made.

SUMMARY

This disclosure provides an apparatus and method for intelligent data access for industrial internet of things devices using latent semantic indexing.

In a first embodiment, a method is provided. The method includes receiving a request, from a computing device, for data associated with an industrial plant. The method also includes generating a session with the computing device. The method further includes gathering nodes from one or more servers associated with the industrial plant, wherein each of the nodes includes data associated a particular feature of the industrial plant. Additionally the method includes deriving contextual links between the nodes and the received request for data to identify levels of similarity between the nodes and the request for data. The method also includes ranking the nodes based on the identified levels of similarity.

In a second embodiment, an electronic device is provided. The electronic device includes a communication unit and a processor. The communication unit is configured to communicate with one or more server and a computing device. The processor is operably connected to the communication unit. The processor is configured to receive a request, from the computing device, for data associated with an industrial plant. The processor is also configured to generate a session with the computing device. The processor is further configured to gather nodes from the one or more servers associated with the industrial plant, wherein each of the nodes includes data associated a particular feature of the industrial plant. The processor is additionally configured to derive contextual links between the nodes and the received request for data to identify levels of similarity between the nodes and the request for data. The processor is also configured to rank the nodes based on the identified levels of similarity.

In a third embodiment, a non-transitory computer readable medium is provided. The non-transitory computer readable medium embodying a computer program, the computer program comprising computer readable program code that when executed by a processor of an electronic device causes the processor to: receive a request, from a computing device, for data associated with an industrial plant; generate a session with the computing device; gather nodes from one or more servers associated with the industrial plant, wherein each of the nodes includes data associated a particular feature of the industrial plant; derive contextual links between the nodes and the received request for data to identify levels of similarity between the nodes and the request for data; and rank the nodes based on the identified levels of similarity.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A-3B illustrate example block diagrams of a communication system in accordance with embodiments of the present disclosure;

DETAILED DESCRIPTION

Figure 1:
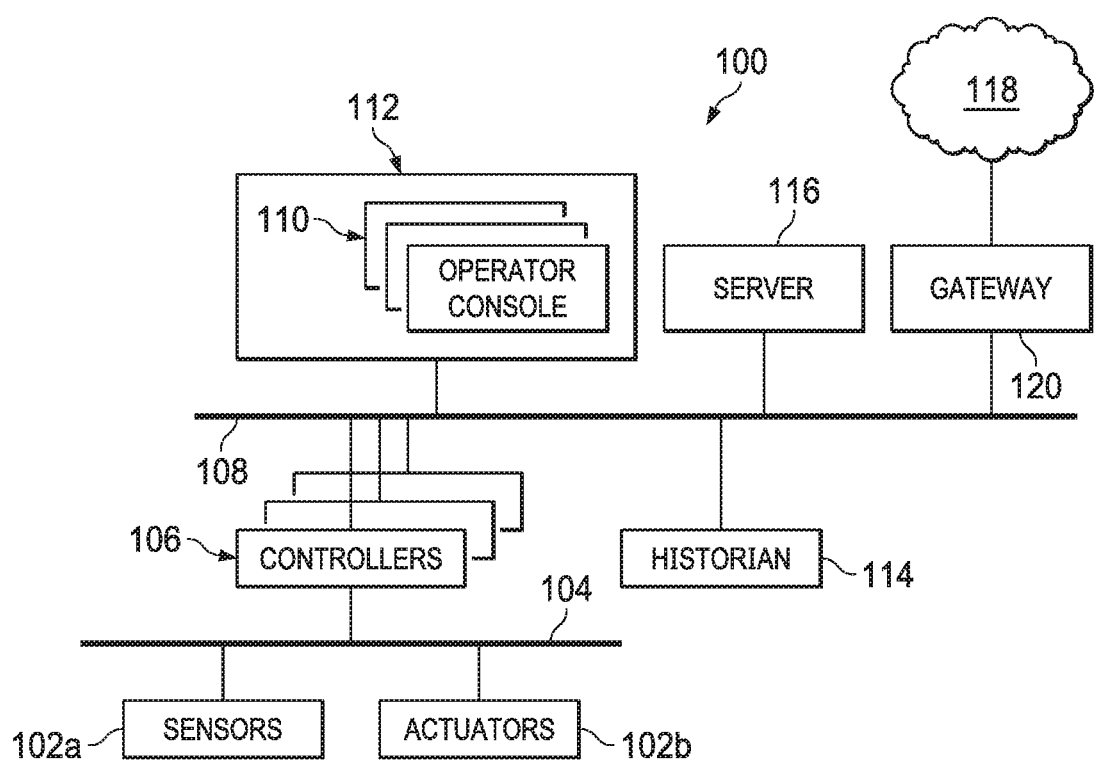
FIG. 1 illustrates an example industrial process control and automation system in accordance with embodiments of the present disclosure.

FIGS. 1 through 6, discussed below, and the various embodiments used to describe the principles of the present invention in this patent document are by way of illustration only and should not be construed in any way to limit the scope of the disclosure. Those skilled in the art will understand that the principles of the invention may be implemented in any type of suitably arranged device or system.

The Internet of Things (IoT) is a network of physical devices that are connected and are able to exchange data or perform various tasks or a combination thereof. IoT includes various devices and entities 'things' that can exchange and process information with and without human intervention. IoT devices are applicable to a variety of fields including smart home, smart building, smart city, smart car or connected cars, smart grid, health care, smart appliances and advanced medical services through convergence and combination between existing Information Technology (IT) and various industrial applications. For example, principles associated with IoT are encroaching into the boundaries of industrial process control and automation systems, referred to as the industrial internet of things (IIoT).

The arrival of IIoT is referred to as the fourth industrial revolution. The first revolution was mechanical based with the advent of steam power. The second revolution was the beginning of mass production. The third revolution originated with communication systems, such as the creation of Programmable Logic Controller (PLC). A PLC allows devices in an industrial setting to communicate and allows a level of control of the various devices. The fourth revolution is currently being experienced with the onset of IIoT including smart sensors, and machine to machine communication networks.

IIoT is changing the manufacturing and processing industries, as devices, equipment, components, sensors, and the like are becoming smarter. Such elements are becoming smarter due to the ability to generate large amounts of data at greater speeds. IIoT devices are also able to communicate between themselves, and perform various actions with and without human interaction. Operators, engineers, and personnel of an industrial plant are struggling to keep up with the drastic increase of data while continually striving to improve the efficiency of the plant. Components that are enhancing the realm of IIoT can include for example sensing technology, wired/wireless communication and network infrastructure, interface technology, security technology, and Machine-to-Machine (M2M) communication.

OPC Unified Architecture (UA) provides a platform for manufacturer-independent communication between devices of an industrial automation systems or plants. For example, OPC UA is a M2M communication protocol for interoperability and includes a cross-platform service-oriented architecture. That is, OPC UA is a communication mechanism for industrial process control systems to communicate by allowing intelligent machines including and IIoT devices to communicate with each other. For example, OPC UA provides an ability to transfer data between enterprise-type systems, control systems, monitoring devices, industrial equipment, sensors, and the like. OPC UA allows for interoperability between devices and machines that utilize different protocols, platforms, architecture, and the like. For example, OPC UA incorporates a large network of devices that can communicate with each other and generate vast amounts of data. In certain embodiments, OPC UA is implemented to and from a cloud based server or servers. Those skilled in the art can appreciate that other systems and protocols in addition to or alternatively of OPC UA can be used interchangeably.

As noted above, industrial automation systems include capabilities that enable the control and monitoring of the system or process. For example, industrial automation systems often include controllers, field devices, sensors, actuators, and computing devices. Such elements allow for gathering, storing, and monitoring data for subsequent analysis. Such industrial automation systems may include one or more devices that may be coupled to the controller and may communicate with other systems. In certain embodiments, the one or more devices of an industrial automation system can be coupled to the controller and may communicate according to the OPC UA protocol. Included in the various devices and elements are IIoT devices that incorporate M2M communication, as well as machine learning. IIoT provides improved quality control and oversight that improves the efficiency of the overall industrial plant.

In certain embodiments, OPC UA allows IIoT devices such as embedded computers associated with sensors, devices, or equipment to communicate with each other as well as with one or more computing devices, such as a server. Various computing devices can store data and values regarding the operational parameters of an industrial automation system. An example of an embedding computer that is associated with a sensor or device is a PLC. A PLC is an example of an embedded computer within an industrial plant. A PLC or similar device provides various data and values via a network connection to a client device operating locally on or remotely from the industrial automation system. Generally the embedded computers, such as a PLC, can convert physical readings into computer readable format such as temperature, pressure, speed, RPM, density, viscosity, operational parameters, and the like. Additionally, embedded computers, such as a PLC, can control the various automation potions of the industrial plant as these computing devices can that collects data can communicate with one or more servers that analyze the data. For example, a higher level PLC can control valves based on sensor readings. For instance, if it is determined that the level of a product within a tank is too low, based upon a sensor's reading, a valve can be automatically opened to let in more product. Conversely, if a tank level is too high, as determined from a sensor reading, a valve can be opened to let product out. In another example, OPC UA also includes an alarm mechanism that generates an alarm if a controlled item is not working properly, such as if a valve is opened to let more product into a tank, but the tank is not being filled.

In certain embodiments, OPC UA can connect databases, analytic tools with data generated from sensors, actuators, and other monitoring type devices that evaluate the various parameters of the industrial plant. The operation of the plant and the operational units can be controlled by various control system including PLCs via several of interlocked elements. A network node can be associated with a PLC. The network node gathers the necessary data and transfers the data to make it available to any other device within the OPC UA environment. That is, such devices can communicate with another device, an IIoT device, a server, a computing device, and the like. A consumer of data at an industrial plant can be referred to as a distributed control system (DCS). The machinery that runs an industrial plant, the PLC that monitors the plant, various IIoT devices within the plant, and the various higher level applications that manage the plan, can all communicate within an OPC UA environment via the OPC UA communication platform. Embodiments of the present disclosure include systems and methods for refining a user experience to enhance the productivity and efficiency of industrial plants. In particular, embodiments of the present disclosure include a user interface that is based on natural language and semantics. Such an interface can provide an improved user experience when a user is interacting with OPC UA, and IIoT devices. For example, the user interface receives a query request from an operator and return results based on the received query. For example, the interface along with a computing device can analyze the received query, identify the context of the query, determine information the operator has access to, and provide a result to the operator.

Embodiments of the present disclosure include system and methods for intelligent data access and semantic interworking between IIoT devices using latent semantic indexing. In certain embodiments, the intelligent data access and semantic interworking between IIoT devices using latent semantic indexing by leveraging exposed OPC UA semantics. The OPC UA environment includes numerous nodes or address spaces that are associated with the various sensors, and equipment of the industrial plant. Context of the received query can be derived based on the nodes within the OPC UA environment, and based on the derived context, an response of the query can be provided to the operator.

Embodiments of the present disclosure recognize that due to the large quantity of data that is collected and available within an OPC UA environment, it is difficult for a user to access a particular quantity, value, setting, alarm, tag, warning, or the like associated with a particular aspect of the industrial plant. For example, even if an operator oversees a portion of the industrial plant, that portion of the industrial plant can include countless sensors, control valves, flow meters, equipotent, parameters, all of which directly affect the operations of the plant. If a user needs to see the set point or a current reading of a particular sensor it requires the operator to know the sensor by name and derive the context associated with the values that are returned. For instance, the name of the sensor could be a series of numbers unrelated to the function of the sensor, and the values returned could lack any contextual details that provide necessary background information concerning the value. Contextual details can include whether the value is a current reading, a set point, a high or low parameter setting, as well as a measurement units the value is based on. An improved mechanism for searching for particular data and an improved user experience can improve the efficiency and productivity of an industrial plant. In certain embodiments, an intelligent data access system is disclosed that improves the interworking between the M2M devices by exchanging data using semantics based on contextualized data. Embodiments of the present disclosure include an information retrieval environment using a sematic contextual query for retrieving specific data from the various connected devices at the industrial plant using OPC UA nodes and contextual tags.

In certain embodiments, OPC UA provides views that limit the data that is available to certain users. A view is used to restrict the number of visible nodes, tags, references or a combination thereof. The restricted information can be limited to a particular area of the industrial plant or can be tailored to a particular task or job description an operator is undertaking at the industrial plant. For example, an operator, a maintenance engineer, a product engineer, and a manager can have different views that provide access to different nodes, tags, and references within the industrial plant. Additionally different operators, maintenance engineers, product engineers, managers, and the like, can have different views as well as have portion s of views that overlap. Certain embodiments of the present disclosure utilize the view services of OPC UA to expose a subset of address spaces or nodes relating to particular equipment and sensors that a user can typically access and assess the information associated therewith.

Embodiments of the present disclosure further recognize and take into consideration that a user interface such as a graphical user interface (GUI) or voice recognition through natural language processing (NLP) can be used in an industrial plant setting. For example, requesting certain data and viewing the response where the response includes the context of the data can improve the overall efficiency of the plant, as the efficiency of the individual operators is improved. For example, a virtual assistant, smart assistant, Artificial Intelligent (AI) assistant, and smart hub, collectively referred to herein as virtual assistant, are a family of devices that perform various tasks and/or services for a user. In certain embodiments, a voice input from a user requesting data through a virtual assistant in an industrial plant can allow a user to orally request data and communicate in natural language with devices and elements of the industrial plant.

Embodiments of the present disclosure include methods and devices to enable an intelligent information retrieval system from the connected devices within an industrial process control and automation system. In certain embodiments, performing a latent semantic analysis derives particular information from a query between a user and various IIoT connected objects. Additionally, embodiments of the present disclosure include a semantic data access interface that allows an operator to input a query and retrieve relevant data via the semantic analysis. That is, embodiments of the present disclosure can obtain a query that includes a request for data in an OPC UA environment, analyze the query, perform a latent semantic search on the query receive relevant information, and then parse through results for a particular node that contains the relevant data based on contextual information.

FIG. 1 illustrates an example industrial process control and automation system 100 according to embodiments of the present disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system. In some embodiments, functions of the controllers 106, described further below, may be integrated into the sensors 102a and the actuators 102b, which may contain OPC UA servers and may connect to the controllers 106 or directly to the network 108. In certain embodiments, one or more sensors 102a and actuators 102b are IIoT devices.

In certain embodiments, the sensors 102a and the actuator 102b are connected to at least one network 104. The network 104 generally represents any suitable communication network(s). The network 104 could represent any suitable network or combination of networks. In certain embodiments, the network 104 is an internal network that provides feedback of the sensor 102a and actuator 102b to owners/ operators of the system 100. In certain embodiments, the network 104 is an external network, outside the control of owners/operators of the system 100, but provides feedback of the sensor 102a and the actuator 102b to a third party network.

The network 104 facilitates interaction with the sensors 102a and the actuators 102b. For example, the network 104 could transport measurement data from the sensors 102a and provide control signals to the actuators 102b. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from the one or more sensors 102a to control the operation of the one or more actuators 102b. For example, a controller 106 could receive measurement data from the one or more sensors 102a and use the measurement data to generate control signals for the one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network or an RS485/RS422 communication network. In certain embodiments, network 108 is similar or the same network as the network 104.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could request information affecting how the industrial process is controlled, such as by requesting set points or control modes for process variables controlled by the controllers 106 or other information that alters or affects how the controllers 106 control the industrial process. This could include requesting this information from the controllers 106 or from other devices such as the historian 114 or the servers 116. In response to such requests, each operator console 110 could receive the requested information. Each operator console 110 includes any suitable structure for displaying information to and interacting with an operator. For example, each operator console 110 could represent a computing device running a WINDOWS operating system or other operating system. In some embodiments, the operator console 110 could represent an embedded OPC UA device.

Multiple operator consoles 110 can be grouped together and used in one or more control rooms 112. Each control room 112 could include any number of the operator consoles 110 in any suitable arrangement. In some embodiments, multiple control rooms 112 can be used to control an industrial plant, such as when each control room 112 contains the operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system, such as a UA server in an embedded device. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In certain embodiments, OPC UA supports multiple servers. For example, various servers can oversee and manage various aspects of the industrial plant. In certain embodiments, each device connected to the OPC UA platform can include an OPC UA server. Different classes of personnel can be associated with different servers based on job title, security clearances, permissions, and the like.

In certain embodiments, the system 100 may optionally include one or more mobile devices such as a mobile "smart" device or a virtual assistant device. The mobile device can be similar to the operator console 110. In certain embodiments, the mobile device can remotely access the industrial plant and automation system 100. Each mobile device could be used to obtain information about one or more industrial processes of the automation system 100 and display the information to users. Each mobile device could also be used to obtain input from the user. The input can be used to adjust or alter the industrial processes of the automation system 100. The mobile device could be used in any other suitable manner in or with the automation system 100. Any suitable type(s) of mobile devices could be used in or with the automation system 100, such as smartphones, tablet computers, laptop computers, virtual assistant, and the like.

At least one component of the system 100 could support a mechanism for intelligently querying process data and other types of data using latent semantic analysis. For example, this functionality could be implemented in the operator console 110, the server 116, or the computing cloud 118 or remote server, such as a query server. The query server is discussed in greater detail below with respect to FIGS. 3A and 3B. In accordance with this disclosure, providing an information retrieval mechanism with reduced cognitive efforts by the personnel of the plant improves the functioning of the industrial plant. In certain embodiments, OPC UA is the M2M communication protocol between devices and equipment of the plant. Utilizing the OPC UA communication system, embodiments of the present disclosure can derive and assign context to the data of the various equipment and devices, determine a natural language request, and return data that responds to the request. For example, an operator accessing the system 100 can retrieve information from the sensors 102a, the actuators 102b, various devices and equipment using natural language inquiries and requests, and receive results based on context of the request. The natural language inquiries can include an oral inquiry, as spoken by a user, as well as an inquiry that is typed or inputted into or received by a computing device.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where intelligently querying process data using latent semantic analysis is possible. This functionality can be used in any other suitable system, and that system need not be used for industrial process control and automation.

Figure 2:
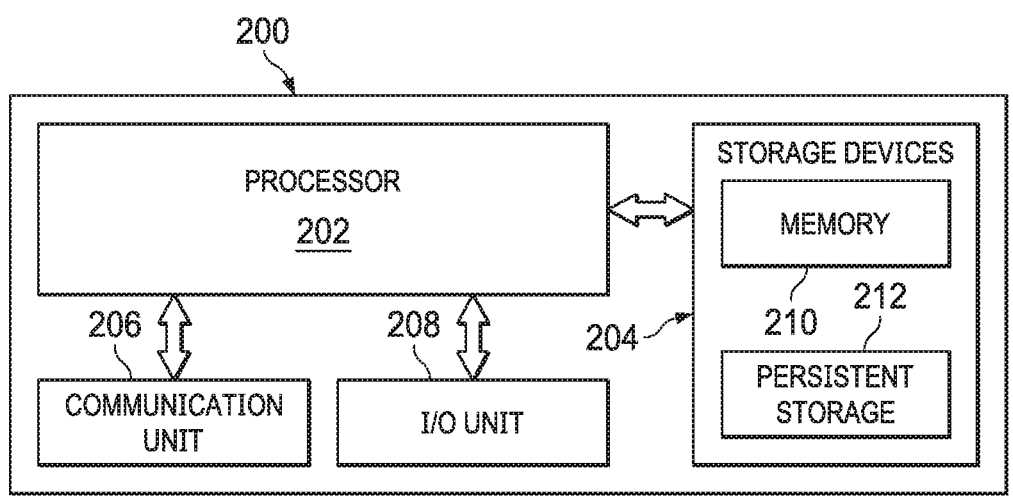
FIG. 2 illustrates an example computing device for intelligently querying process data using latent semantic analysis in accordance with embodiments of the present disclosure.

FIG. 2 illustrates an example device 200 for intelligently querying process data or an aggregation of process data using latent semantic analysis according to this disclosure. In some embodiments, the device 200 could denote the operator console 110, the server 116, device used in the computing cloud 118 described above with respect to FIG. 1, or a computing device. However, the device 200 could be used in any other suitable system. In some embodiments, the device 200 is an IIoT device. The device 200 could be used to run applications. The device 200 could be used to perform one or more functions, such as receiving an input for information about the industrial plant or deriving a result for the received input and providing the result, or a combination thereof. For ease of explanation, the device 200 is described as being used in the system 100 of FIG. 1, although the device could be used in any other suitable system (whether or not related to industrial process control and automation).

As shown in FIG. 2, the device 200 includes at least one processor 202, at least one storage device 204, at least one communication unit 206, and at least one input/output (I/O) unit 208. Each processor 202 can execute instructions, such as those that may be loaded into a memory 210. The instructions could intelligently process queries for process data using latent semantic analysis. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communication unit 206 supports communications with other systems or devices. For example, the communication unit 206 could include a network interface card or a wireless transceiver facilitating communications over a wired or wireless network. The communication unit 206 may support communications through any suitable physical or wireless communication link(s).

The I/O unit 208 allows for input and output of data. For example, the I/O unit 208 may provide a connection for user input through a keyboard, mouse, keypad, touchscreen, microphone, or other suitable input device. The I/O unit 208 may also send output to a display, printer, or other suitable output device.

Although FIG. 2 illustrates one example of a device 200 for intelligently querying process data using latent semantic analysis, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3A:
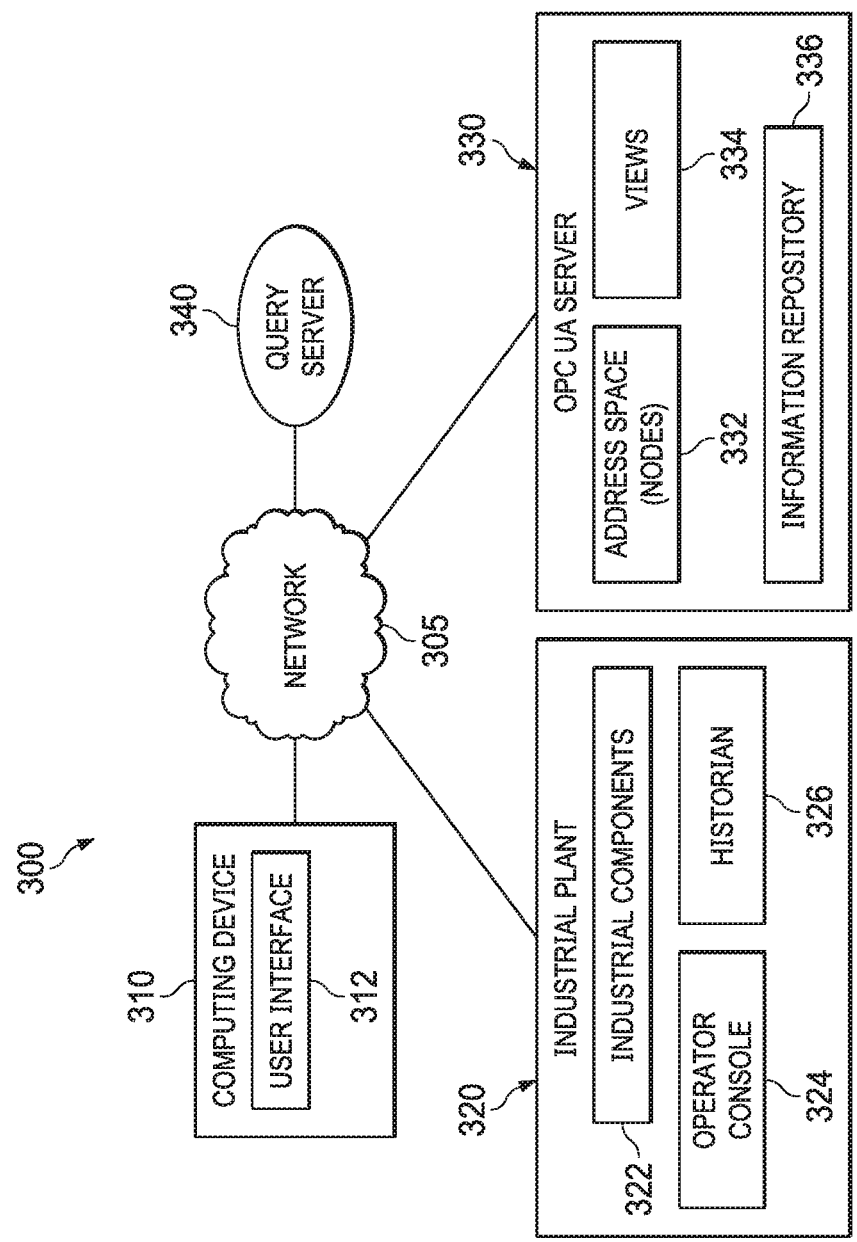

FIGS. 3A and 3B illustrate an example block diagram of a communication system in accordance with embodiments of the present disclosure. FIGS. 3A and 3B illustrate a high-level architecture, in accordance with an embodiment of this disclosure. The embodiment of the environment 300 shown in FIGS. 3A and 3B are for illustration only. Other embodiments can be used without departing from the scope of the present disclosure.

The environment 300 includes a computing device 310, an industrial plant 320, an OPC UA server 330, and a query server 340 all communicating over a network 305. In certain embodiments, the query server 340 is included in the industrial plant 320, the OPC UA server 330, the computing device, a remote server, on a cloud, or the like. For example, the query server 340 can be a stand-alone device, fully incorporated or partially incorporated into the OPC UA server 330. In another example the query server 340 is an independent service on a network. In certain embodiments, the OPC UA server 330 is included in the industrial plant 320. In certain embodiments, the computing device 310 is included in the industrial plant 320, such as an operator console 110 of FIG. 1.

In certain embodiments, the network 305 includes a larger networking environment. For example, the network 305 can be used for communication between the computing device 310, the elements within industrial plant 320 including the automation system 100 of FIG. 1, the OPC UA server 330, and the query server 340. The network 305 also is able to provide communication medium between the industrial plant 320 and additional servers and equipment. For example, the network 305 can also communicate with an information repository (such as a database) that contains historical data pertaining to the industrial plant 320. The database can be similar to the historian 114 of FIG. 1. In another example, the network, 305 can also communicate with a latent semantic analysis engine 390. The latent semantic analysis engine 390 is illustrated as part of the query server 340 in FIG. 3B. In certain embodiments, the latent semantic analysis engine 390 is a standalone component that communicates directly with the network 305. For example, the latent semantic analysis engine 390 can be a cloud based service that the query server utilizes when performing data retrieval for a received query from a user.

In certain embodiments, the network 305 represents a "cloud" of computers interconnected by one or more networks, where the network 305 is a computing system utilizing clustered computers and components to act as a single pool of seamless resources when accessed. In certain embodiments, the network 305 represents a wireless network that can range is sized from Near Field Communication (NFC) to Local Area Networks (LANs) to wide area networks (WAN). In certain embodiments, the network 305 provides access to the internet or other remote networks.

The computing device 310 can be a personal electronic device, such as a wearable device, a tablet, a laptop, a desktop computer, virtual assistant, and the like. The computing device 310 can be similar to any operator console, such as the operator console 110 of FIG. 1, or controller, such as the controller 106 of FIG. 1, or any combination thereof. In certain embodiments, the computing device 310 and the operator console 324 (discussed in further detail below with respect to FIG. 3A) are the same. The computing device 310 can include internal and external components as previously depicted and described in further detail with respect to FIG. 2. The computing device 310 can be located within the industrial plant 320, or remotely located. Regardless of the location of the computing device 310, the computing device 310 is operably able to communicate the industrial plant.

In certain embodiments, the computing device 310 is an electronic device that does not operate on the OPC UA platform. For example the computing device 310 does not communicate via OPC UA communication protocols with the industrial plant 320, the OPC UA server 330, or the query server 340. In another example, the computing device 310 is not an OPC UA client device. An operator of the industrial plant 320 can use the computing device 310 to access the query server 340. The computing device can communicate with the query server 340, the OPC UA server 330, or both via middleware that allows the devices to exchange messages. The computing device 310 includes a user interface such as user interface 312.

The user interface 312 allows a user to provide an input such as a query or a request for information regarding one or more components of the industrial plant 320. The user of the computing device 310 can include an operator, an engineer, a product administrator, a system administrator, a manager, staff, personnel, or any other type of other individual who can access, view or change settings of the industrial plant 320. In certain embodiments, the user interface 312 is a microphone that receives a spoken natural language request from a user. If the input is an oral natural language input, then the computing device 310 can include a natural language processor. The natural language processor is operably able to convert the received input into a computer readable format. In certain embodiments, the user interface 312 is an input device such as a keyboard or a touch screen touch screen that allows a user to type a request for certain information. The user interface 312 allows a user to input a request for data and provide a response that includes the requested data. For example, the user interface can provide to the user diagnostic data, process data, security information, analytical information, and log entries, and the like, upon a received request from the user.

The industrial plant 320 is similar to the industrial process control and automation system 100 of FIG. 1. In certain embodiments, the industrial plant 320 includes an automation system with IIoT devices that communicate via OPC UA protocols. The industrial plant 320 includes industrial components 322, an operator console 324, and a historian 326.

The industrial components 322 include various sensors, actuators, equipment, and devices that are utilized to operate and control the industrial plant 320. For example, the sensors, actuators, and equipment of the industrial components 322 can be similar to the sensors 102a and the actuators 102b of FIG. 1. The industrial components 322 can also include equipment, such as boilers, tanks, engines, turbines, and the like. Additionally the industrial components 322 can include various control devices, such as control valves, flow meters, and the like. In certain embodiments, a portion or all of the various equipment, devices, sensors included in the industrial components 322 are IIoT devices that communicate using OPC UA protocols.

The operator console 324 can be similar to the operator console 110 of FIG. 1. In certain embodiments, the operator console 324 can include an OPC UA client. The OPC UA client allows the operator console 324 to communicate and interact with the one or more OPC UA servers 330.

The historian 326 can be similar to the historian 114 of FIG. 1. In certain embodiments, the elements of the industrial plant 320, such as the industrial components 322, the operator console 324, and the historian 326 all communicate via OPC UA protocols. In certain embodiments, the operator console 324 is the computing device 310.

The OPC UA server 330 is the communication platform and provides the communication protocols that interconnect the component and industrial plant 320. The OPC UA server 330 enables the elements of the industrial plant 320 (such as the industrial components 322, the operator console 324, and the historian 326) to generate, transmit, receive, and access a data without the need to understand the entirety of the industrial plant 320. For example, the OPC UA server 330 a platform that allows for process control of the devices included in the industrial plant 320. In certain embodiments, the OPC UA server 330 represents any number of OPC UA servers functioning in unison to control the automation system of the industrial plant 320. Those skilled in the art can appreciate that other systems and protocols in addition to or in alternative of the OPC UA server 330 can be used interchangeably. The OPC UA server 330 includes address space 332, views 334, and an information repository 336.

The address space 332 provides a mechanism for contextualizing data associated with the industrial plant 320. The OPC UA server 330 exposes information from the industrial plant 320 to a user and allows the user to manage the underlying processes of the industrial plant 320 in real time. The OPC UA server 330 manages the information that is generated from the elements of the industrial plant 320. For example, the OPC UA server 330 ensures that the information is transferable, addressable, and meaningful. The information is transferable when a mechanism such as the OPC UA communication protocols allows the data to transfer over the network. The information is addressable as the address space 332 allows data to be selectively accessed. The address space 332 also includes context that denotes meaning and environmental background to the information. That is, the address space 332 exposes the data from the industrial plant 320 in an addressable and meaningfully manner.

The address space 332 exposes network nodes to the user in a meaningful context. Each node is associated with one or more particular pieces of industrial component 322. Each node can be interconnected with other nodes. The interconnection of nodes adds meaning and context to each value generated from the node. In certain embodiments, each node can belong to a particular node class. Example node classes include a (i) view, (ii) object, (iii) variable, (iv) method, (v) object type, (vi) data type, (vii) reference type, and (viii) variable type. A view defines a subset of nodes in an address space, such as the address space 332. An object is used to represent systems, system components including real-world objects and software objects. A variable node provides data and is used as a real time process data holder. A method node represents a function that is associated with an object. An object type provides a definition for a particular object. The data type defines data types of variable nodes. A reference type node provides a meaning to the particular relationship the node shared with other nodes. The variable type provides a definition for the variable nodes.

For example, equipment, sensors, actuators, valves, and the like can each have one or more tags, such as a node, that identify the device, sensor, or value (such as a value received from a sensor), as well as provide contextual data associated with each component, and the relationship to other nodes. The address space 332 can also define various objects in terms of variables and methods which allow relationships to exist between each object. For example, the address space 332 associates a node with each type of equipment or sensor in order to create context of the data associated with each element. That is, the address space 332 identifies and categorizes types of data in order to provide context of the data. The address space 332 contextualizes the data generated from the industrial plant 320 by relating the various industrial components 322.

In certain embodiments, the address space 332 can associate an attribute and a reference with each node. For example, the address space 332 assigns a node to a sensor, and the node includes both an attribute and a reference. An attribute can describe the node and include a class definition such as a data type, a name, and the like. A reference can relate one node to another node. For example, if a sensor returns a value of "50," the node attribute can define the value as a pressure in units of Pounds per Square Inch (PSI). The reference can relate the sensor reading to a particular piece of equipment such as a boiler. The reference can be used to relate the sensor reading to a particular area of the boiler such as an inlet pressure, an outlet pressure, internal pressure, and the like. In another example, the address space 332 provides a value with a name, an identification code, a location within the industrial plant 320, a measurement unit, provide high and low limits and the like.

In certain embodiments, the address space 332 can be organized as a hierarchy of elements similar to a file tree. For example, the highest level is the industrial plant 320. A subsequent level can depict various portions of the industrial plant, such as manufacturing, packaging, quality control and the like. Another subsequent level can depict various portions of the industrial plant, such as a particular areas, first floor, second floor, and the like. Another subsequent level can depict the categories within the sensors, actuators, and equipment, with further subsequent levels listing the industrial components. For instance, level one is the industrial plant, level two is a list of equipment, level three is a list of the boilers, level four is the data associated with a particular boiler, such as internal pressure, temperature, flow and the like.

Views 334 is an internal representation of data within the OPC UA server 330. For example, a user may only have interest in only a specific subset of data and therefore does not wish to view particular nodes in the address space 332. Views 334 is similar to a filter that filters certain nodes while other nodes remain accessible to a user, based on the particular user. It is noted that views 334 can represent any number of views.

Views 334 defines subsets of the nodes in the address space 332. For example, each node in a particular view 334 may include only a subset of its references. View 334 restricts the number of visible nodes and references of the address space 332. For example, views 334 organizes the nodes of address space 332 and provides only the nodes that are tailored to specific tasks or use cases. In certain embodiments, views 334 includes a number of different groupings such as personnel type who oversee the industrial plant 320 as well as collection of address spaces 332 for each area or areas in the industrial plant 320 to particular person eel oversee. For example, if a single operator can oversee the operation of a single piece of equipment, then a view 334 for that operator can include the equipment and any other address spaces that relate to the piece of equipment. For instance, views 334 for the operator can include address spaces 332 that include the status of the piece of equipment and any parameters or readings from one or more sensors sounding the piece of equipment.

The information repository 336 can be implemented using any architecture known in the art, such as a relational database, an object-oriented database, one or more tables, or a combination thereof. The information repository 336 stores data generated and transmitted by the industrial components 322, in terms of nodes and address spaces. In certain embodiments, the OPC UA server 330 utilizes the information repository when historical data is requested is real-time data is not accessible.

Query server 340 of FIG. 3A is the same as the query server 340 of FIG. 3B. In particular, the query server 340 of FIG. 3B is an expanded view of the components of the query server 340 of FIG. 3A. Generally, the query server 340 is a server that receives a query or a request for information from a user and extracts the answer from the OPC UA server 330 concerning the industrial plant 320. In certain embodiments, a plurality of OPC UA servers 330 are associated with the industrial plant 320. In certain embodiments, the query server 340 can be a software-as-a-service (SaaS). In certain embodiments, a portion of the query server 340 can be a SaaS. In certain embodiments, the query server 340 is part of the OPC UA server 330. In certain embodiments, the query server 340 is a server located within the industrial plant 320. In certain embodiments, the query server 340 is a cloud based server located remotely from the industrial plant 320. Query server 340 includes a session generator 350, aggregator server 360, cached views 370, semantic construct cache 380, a latent semantic analysis engine 390, and a query engine 395.

The query server 340 receives an input from the computing device 310 (or the operator console 324). When a query is received, the query server 340 analyzes the query to extract what is being asked, identifies results, and returns the most probable answer to the requested query. The query server 340 can extract the semantics created by the OPC UA server 330 and perform a contextual analysis of the address space 332 to provide a contextual response based on one or more nodes. The query server 340 can also filter the results based on the particular view 334 that the user utilizes when accessing the OPC UA server 330.

In certain embodiments, the elements within the query server 340 can be standalone located in remote servers and computing devices. For example, the query server 340 can includes two or more individual servers. For instance, the query server 340 can include a query server (that includes the session generator 350, the aggregator server 360, the cached views 370, the semantic construct cache 380, and the query engine 395) and a separate server for the latent semantic analysis (similar to the latent semantic analysis engine 390, discussed in greater detail below with respect to FIG. 3B). In another example, the query server 340 can include a query server (that includes the session generator 350, the cached views 370, the semantic construct cache 380, and the query engine 395), the aggregator server 360, and a latent semantic analysis server (similar to the latent semantic analysis engine 390, discussed in greater detail below with respect to FIG. 3B). Other implementations, locations, and components of the various servers can be appreciated by those skilled in the art.

In certain embodiments, the query engine 395 oversees the functioning of the query server 340. For example, the query engine 395 instructs the various components of the query server 340 (such as the session generator 350, the aggregator server 360, the cached views 370, the semantic construct cache 380, and the latent semantic analysis engine 390) to perform various tasks for the processing of the received query. In certain embodiments, the query engine 395 converts the received query into a semantic query. A semantic query identifies relationships between information of the query.

In certain embodiments, when the query server 340 receives a query from a non-OPC UA device, the query engine 395 instructs the session generator 350 to create a session, such as session 352a. In certain embodiments, the session generator 350 generates a session (or uses an existing session) in response to the query server 340 receiving a query. The session generator 350 provides a platform for the non-OPC UA device to interact with the OPC UA server 330. In certain embodiments, each session created by the session generator 350 is a simply handshake between the two devices. The handshake establishes a unique session between the client device and the OPC UA server 330.

The session generator 350 creates individual sessions between a non-OPC UA device (the client device, such as the computing device 310) and the OPC UA platform, such as the OPC UA server 330. For example, when the computing device 310 requests information from the OPC UA server 330, the devices are unable to interact. The session generator 350 allows the computing device 310 to access the OPC UA server 330 by creating a valid session between the devices. For instance, the session 352a and the client session 354a represent a single session, with session 352a as the computing device 310 side and client session 354a as the OPC UA server 330 side. Through the session 352a and the client session 354a, the computing device 310 is able to interact with the OPC UA server 330. The sessions act as a handshake between the computing device 310 and the OPC UA server 330.

In certain embodiments, each query that comes in a new session is created. For example, session 352n will connect to the client session 354n, where n represents any subsequent session. In certain embodiments, a single session (session 352a and client session 354a) is established between the computing device 310 and the OPC UA server. Additional sessions are generated for each additional computing device 310 that attempts to interact with the OPC UA server 330. In certain embodiments, additional sessions can be generated if a delay occurs, such as a time-out period between the computing device 310 and the OPC UA server 330. For example, if a predetermined period of time elapses where the computing device 310 and the OPC UA server 330 are idle, a new session can be created between the two devices.

In certain embodiments, each session such as session 352a to the client session 354a converts a query that originated in a non-OPC UA language into a computing language that is understood by the OPC UA platform. For example, each session can include middleware that allows the two devices to communicate.

Each session, such as session 352a that connects to the client session 354a allows the query engine 395 to identify the particular user of the computing device 310. Based on the identity of the user, the particular views 334 available to the user can be identified. It is noted that the identified views narrow the results of the latent semantic analysis, by filtering address space 332 that the user does not have access to.

The aggregator server 360 aggregates the data from multiple servers, such as server 362a, server 362b, through server 362n. Each server 362a-362n represents a single OPC UA server, similar to OPC UA server 330. The aggregate server 360 aggregates the address spaces (such as address space 332) from each server 362a-362n. In certain embodiments, the aggregated address spaces include equipment or sensor readings. In certain embodiments, the aggregated address space includes the various node classes to identify and provide context of each value associated with the industrial components 322. For example, if a query requests a specific piece of information, the aggregate server 360 aggregates the address spaces of each server into one location. The aggregate server 360 can include an information repository where the aggregated address spaces are saved.

In certain embodiments, the aggregator server 360 aggregates the address spaces from all of the servers, such as the servers 362a-362n, for each received query. In certain embodiments, the aggregator server 360 aggregates the address spaces from all of the servers, such as servers 362a-362n, when a new session is created by the session generator 350. When the aggregator server 360 aggregates or gathers data from the plurality of servers for each received query, the aggregation of the servers yields updated value of the address spaces associated with each server. In contrast, processing power can be saved when the aggregator server 360 aggregates the servers only when a new session is created, and not for each received query. In certain embodiments, the aggregator server 360 aggregates only a portion of each server when a new query is received for an existing session. The portion of each server that is aggregated can be based on the type of the query. For example, the aggregation server 360 can aggregate the data from a portion of one or more servers in order to update particular address spaces, such as the address space 322.

The cached views 370 analyzes the one or more views such as view 372a, view 372b, through view 372n. Each of the views 372a-372n can be associated with a server such as server 362a-362n. Each of the views 372a-372n are similar to the views 334 of the OPC UA server 330. For example, each of the views, such as view 372a, identifies a particular view associated with a single user or a group of users who access a particular OPC UA server, such as server 362a. In certain embodiments, a user or group of users can access a single view across multiple servers. In certain embodiments, a user or group of users can access a multiple view across multiple servers. For example, a user can access one or more views across one or more servers.

The cached views 370 gathers the particular views (selected from views 372a-372n) that are accessible to the user. The collected views that are accessible to the user can be gathered from the aggregator server 360 which gathered all the nodes from the various servers. For example, the cached views 370 selects the particular nodes that are available to the user. Thereafter, the semantic construct cache converts the various nodes into semantic constructs via the rule engine 382 and stores the data in the information repository 384.

The particular views that are associated with a user can be identified based on the information exchanged when a session is created by the session generator 350. For example, when a user initiates a session, basic information is exchanged between session 352a and client session 354a. The information can include credentials that allow an OPC UA server to identify the user, and thereby grant access to the user. Since the user who initiated a particular session is identifiable, the particular views associated with the user are also identifiable.

In certain embodiments, for each new session that is created by the session generator 350, the cached views 370 caches the views 372a-372n of the user who initiated the new session. In certain embodiments, the cached views 370 caches the views 372a-372n of the user for each new query of the user. Caching the views for each new query can provide real time data for the user.

The semantic construct cache 380 analyzes the cached views from cached views 370 and constructs a cache based on the nodes associated with the cached views. The semantic construct cache 380 includes a rule engine 382 and an information repository 384.

The rule engine 382 converts the views that are cached in the cached views 370 into semantic constructs, and stores the semantic constructs in the information repository 384. In certain embodiments, the information repository 384 is similar to the information repository 336. In certain embodiments, the rule engine 382 converts the data associated with each node of the cached views 370. That is, the rule engine 382 only converts the nodes that are in the views available to the user. The nodes can be selected from the aggregator server 360 which gathered all the nodes from the various servers 362a-362n. In certain embodiments, the rule engine 382 can create numerous text files for each node dependent on the various data that is associated with a node. For example, if a node is a boiler, then all of the parameters and sensors associated with the particular boiler can have their own semantic construct file. In another example, if the node is a sensor, then all the parameters that are related to the sensor, such as equipment and other sensors can have individual semantic construct files as well. Each file created by the rule engine 382 can be associated with a single piece of industrial components 322. Within the file, the various relations and value of the address space 332 that is associated with the particular piece of the industrial components 322 is included. In certain embodiments, the rules engine 382 generates a single file that includes all the nodes within the canceled views 370.

In certain embodiments, the rule engine 382 processes and cleans each node of the semantic construct for the latent semantic analysis engine 390. For example, the rule engine 382 can remove noise associated with each set of data. In another example, the rule engine 382 can remove stop words including domain specific words.

The query engine 395 utilizes the latent semantic analysis engine 390 to perform the semantic analysis of the semantic construct cache stored in the information repository 384. In certain embodiments, the query server 340 includes a latent semantic analysis engine 390 that performs the analytical search. In certain embodiments, the query engine 395 accesses an external latent semantic analysis engine to perform the analytical search. For example, the latent semantic analysis engine 390 can be a standalone component such as a cloud based service, or part of the query engine. In certain embodiments, the latent semantic analysis engine 390 assigns context to the query. In certain embodiments, the latent semantic analysis engine 390 ranks the nodes of the address space 332 based on a determination of the most relevant nodes with respect to the received query.

The latent semantic analysis engine 390 processes the query received from the client device. As discussed above, the query can be received from an OPC UA client, the computing device 310, or an operator console 324. The OPC UA client can be a standalone define or included as part of the computing device 310 or the operator console 324. In certain embodiments, the computing device 310 or the operator console 324 can include a virtual assistant that receives the query. In response to receiving the query, the latent semantic analysis engine 390 can identify and match the cached nodes in the information repository 384 to the received query. The query engine 395 can present the response to the querying client, such as the computing device 310. If an exact match is not found, the latent semantic analysis engine 390 can return a relevant node (or nodes) to the querying client (such as the computing device 310) to display the ranked results to the user.

The latent semantic analysis engine 390 can map the received query to the particular cached file within the information repository 384. The latent semantic analysis engine 390 can compare the semantic information in the received query with the semantic information of each node of the aggregated address space as created by the rule engine 382 and stored in the information repository 384.

It is noted that the latent semantic analysis engine 390 analyzes the semantic construct cache 380 that is stored in the information repository 384. The semantic construct cache is based on the views that are available only to the user who requested the query and includes the nodes associated with each OPC UA server associated with the industrial plant 320. As a result, the latent semantic analysis engine 390 reviews the data located in one place and does not utilize any OPC UA communication protocols when reviewing the semantic constructs within the information repository 384.

When the semantic analysis is complete, the latent semantic analysis engine returns a particular node ID to the query engine 395. Based on the received node ID the query engine identifies the requested information from the query and provides a relevant response to the user.

In certain embodiments, the latent semantic analysis engine 390 cannot identify a single node ID but rather can identify several node IDs that are relevant. In this scenario, the latent semantic analysis engine 390 ranks each node ID and returns multiple node IDs to the query engine 395. When the query engine receives the multiple ranked node IDs from the latent semantic analysis engine 390, the query engine 395 looks up each node and provides the results to the user with their ranking. For example, when the latent semantic analysis engine 390 returns ranked nodes to the query engine 395, the query engine 395 retrieves the data associated with the ranked nodes. In certain embodiments, the query engine 395 only retrieves the data associated with the highest ranked nodes. After the query engine 395 retrieves the relevant data for the ranked nodes, the query engine 395 returns the results to the requesting device, such as computing device 310. In certain embodiments, the query engine 395 only returns the highest ranked result to the computing device 310. In certain embodiments, the query engine 395 returns the top three results to the requesting device. In certain embodiments, the query engine 395 can receive a user preference that indicates the number of returned results that the query engine is to provide to the computing device 310.

The query engine 395 can return to the client device various types of data, such as (i) diagnostic data, (ii) process data, (iii) security information, (iv) analytical information, (v) log entries, and the like. Diagnostic data includes indicates the health of a particular node. For example, the query engine 395 can return to the client device an indication as to whether a sensor is functioning correctly. The process data includes values that from a sensor reading, such as temperature, pressure, RPM, and the like, which are associated with a substance, or device. The security information indicates whether a particular node was denied access to a particular portion of data, and if so, how many times access was denied over a certain period. Analytical information can include relationships between the various nodes such as if the pressure at location A is high, and the pressure at location B is low, a particular valve should be opened. Log entries include the various changes made to parameters of the automation system 100.

Figure 4:
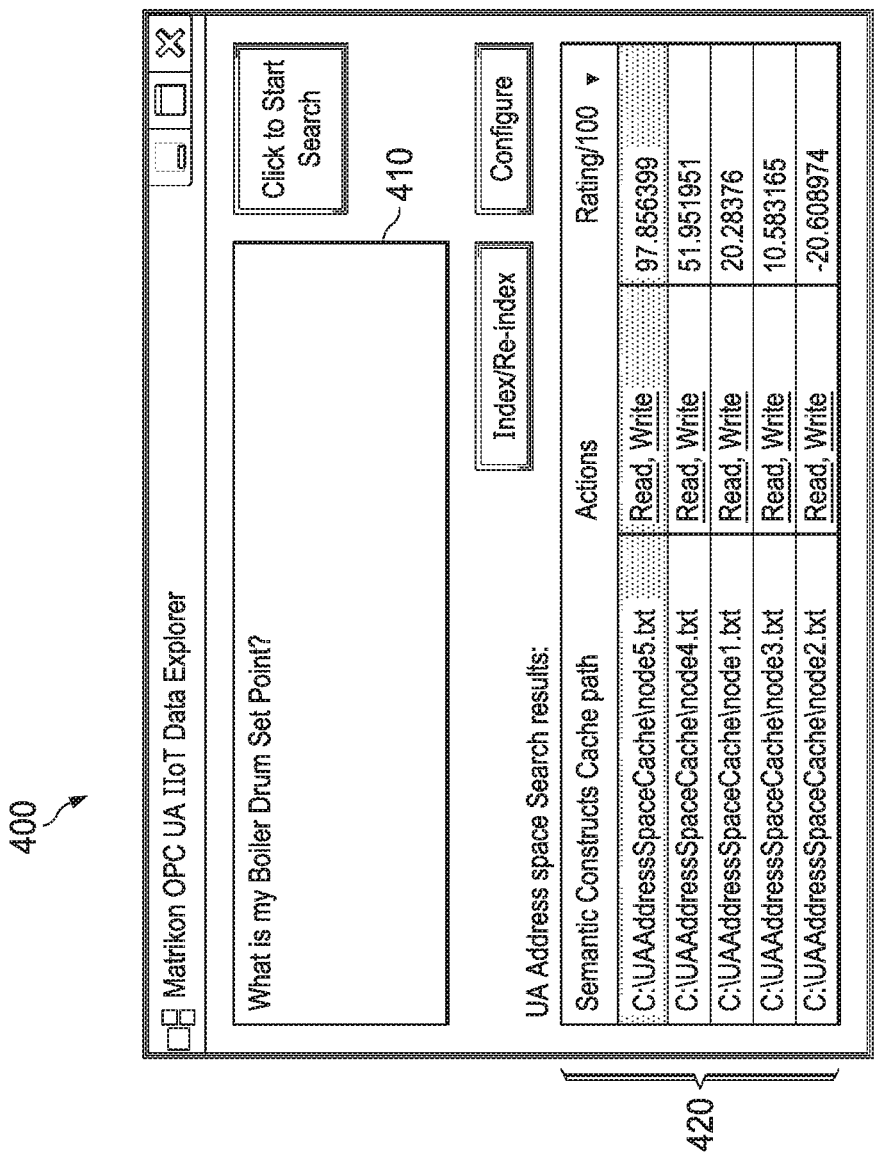
FIG. 4 illustrates latent semantic analysis search results in accordance with embodiments of the present disclosure.

FIG. 4 illustrates latent semantic analysis search results 400 in accordance with embodiments of the present disclosure. The latent semantic analysis search results 400 are for illustration only. Other embodiments can be used without departing from the scope of the present disclosure.

The latent semantic analysis search results 400 include a query 410 and the results 420. For example, a user via computing device 310 of FIG. 3A inputs "what is my boiler drum set point?" The input from the user can be oral query or a typed query. The computing device 310 enters into a session with the query server 340 of FIGS. 3A and 3B. The session generator identifies the user and the cached views 370 of FIG. 3B caches the views associated with the user. If the session generator does not identify the user, the process ends. Additionally, the aggregator server aggregates and combines the data from all the OPC UA servers, such as the OPC UA server 330 and server 362a-362n. The rule engine 382 converts the data that is aggregated from each server and the cached views available to the user and generates a semantic construct of the address space and nodes. The latent semantic analysis engine 390 can then analyze the query and the semantic construct cache stored in an information repository, similar to the information repository 384 of FIG. 3B. The latent semantic analysis engine 390 can return various node IDs that are ranked in order of relevancy that are associated with the data from the semantic construct cache. The query engine 395 of FIG. 3B can then retrieve the data and transmit it to the computing device 310. Thereafter, the computing device 310 displays the results 420 to a user. The results 420 are ranked in order of relevancy as determined by the latent semantic analysis engine 390. In certain embodiments, the user selects the particular address space to view the result. In certain embodiments, the results also include the results without requiring a user to select a particular result to view.

Figure 5:
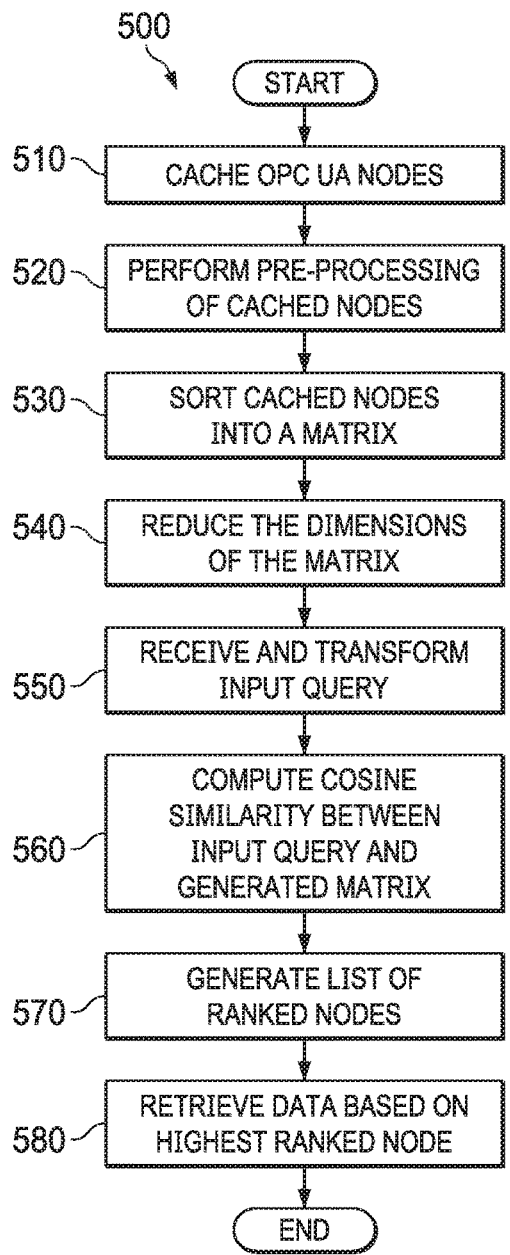
FIG. 5 illustrates an example process for data retrieval in accordance with embodiments of the present disclosure.

FIG. 5 illustrates an example process 500 for data retrieval in accordance with embodiments of the present disclosure. The process 500 does not limit the scope of this disclosure to any particular embodiments. While the process 500 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the steps of the process 500 are described with respect to query server 340 of FIGS. 3A and 3B.

As shown in process 500, at step 510 the query server 340 caches the OPC UA nodes. In certain embodiments, all of the OPC UA nodes associated with one or more OPC UA servers are cached. In certain embodiments, the query server 340 can aggregate the data from all of the OPC UA servers when gathering all the OPC UA nodes. For example, when the OPC UA servers are aggregated, the nodes and address spaces which contain the data from the servers are then located in a single location. The cached nodes contain semantic information about each node and address space of the OPC UA servers. The cached nodes can be stored in an information repository, similar to the information repository 384 of FIG. 3B. In certain embodiments, the query server 340 selects only the nodes that are available to the user based on the views accessible to the user. In certain embodiments, when the query server 340 gathers and caches the OPC UA nodes, each node is stored in an individual file or document. For example, the rule engine 382 of FIG. 3B converts each node into an individual document that contains the references of each node. The documents can be saved in the information repository 384 of FIG. 3B. In certain embodiments, the nodes belong to an OPC UA information model. OPC UA information models include data access, history access and alarms and conditions. The data access includes real time data from a sensor or piece of equipment. The history access maintains time series data for a sensor or piece of equipment. The alarms and conditions is a log of the alarms, changes, and errors associated with OPC UA system.

At step 520 the query server 340 performs a pre-processing of the cached nodes. The query server 340 performs text pre-processing of the cached OPC UA nodes from step 510. For example, the query server 340 removes noise from the data of the cached nodes. In another example, the query server 340 can apply a stop word pre-processing to remove noise such as stop words. The stop words can include frequently included domain specific words. The pre-preprocessing of noise can assist the latent semantic analysis engine when scanning and analyzing the semantic construct cache to provide responses to the received query. The pre-processing can be performed to each file or document individually, when each node or address space is represented by an individual file or document.

At step 530 the query server 340 organizes the pre-processed data into a matrix. In certain embodiments, if each of the preprocessed data is included in individual files or documents, the query server 340 organizes the pre-processed data into a matrix for word counts. In certain embodiments, the query server 340 can use a term frequency inverse document frequency (TF-IDF) to identify the importance of particular terms. If the rule engine 382 of FIG. 3 converts the various nodes from views 372a-372n (that are accessible to the user) into individual documents, by applying a TF-IDF to the set of documents (where various stop words have been removed) indicates the importance of particular words and phrases that occurs throughout the documents. TF-IDF can produce values that increase the proportionality of the number of times a particular word appears in a document and is then offset by the frequency of the word in the corpus. The more times a particular term appears within the semantic construct documents indicates the importance of the term itself. TF-IDF is a numerical statistic that reflects the importance of particular words in relation to a single document as well as in a collection of documents. The number of times a particular term appears in a single document can be referred to as term frequency. The importance or specificity of the term can be then quantified as an inverse function of the number of documents in which the term appears. Taking the inverse function of the number of documents in which a particular term occurs normalizes the term throughout the totality of the documents. For example, if a term appears in a single document many times, but does not appear in any other document, it can be given a low importance value. In another example, if a term appears several times in numerous documents, the term can be given a higher value due to its presence multiple times in a single document as well as occurring in multiple documents.

At step 540, the query server 340 applies a Singular Value Decomposition to the matrix. The Singular Value Decomposition reduces the dimensionality of the matrix. The Singular Value Decomposition factors the matrix to reduce the complexity of the generated matrix. Reducing the complexity of the matrix allows the latent semantic analysis engine, such as the latent semantic analysis engine 390 of FIG. 3B, to analyze the matrix and the query efficiently.

At step 550 the query server 340 receives an input query. In certain embodiments, the input query can be received prior to step 510. In response to receiving the input query, the query server 340 is transformed into a pseudo-document. That is, the input query is represented as vectors. For example, transforming the input query creates a pseudo-document where the input is represented in a vector form.

At step 560 the query server 340, using a latent semantic analysis engine (similar to latent semantic analysis engine 390 of FIG. 3B) performs a cosine similarity between the two vectors. In particular the latent semantic analysis engine performs a cosine similarity between the input query and the generated matrix. The generated matrix is the reduced matrix from step 540. The cosine similarity analyzes the matrix that includes the nodes and address spaces as well as the received input query that is represented as a vector form in a pseudo-document. The cosine similarity identifies similarities between the query and the document terms within the matrix.

At step 570 the query server 340 receives from the latent semantic analysis engine a ranking list. The ranking list indicates a high level of similarity between the query and the documents terms. For example, if the query included the term boiler, and three address spaces included the term boiler all three address spaces are returned. The latent semantic analysis engine ranks the three address spaces based on the most relevant results.

In step 580 the query server 340 can provide to the user of the query the ranked results. In certain embodiments, the query server 340 gathers the data associated with the highest ranked result and displays the result to the user. In certain embodiments, the query server 340 transmits the node names to the user (similar to FIG. 4) and allows the user to select the correct node for information retrieval. In certain embodiments, the query server 340 selects the highest ranked node and retrieves data from the actual node, such as the sensor or device.

Figure 6:
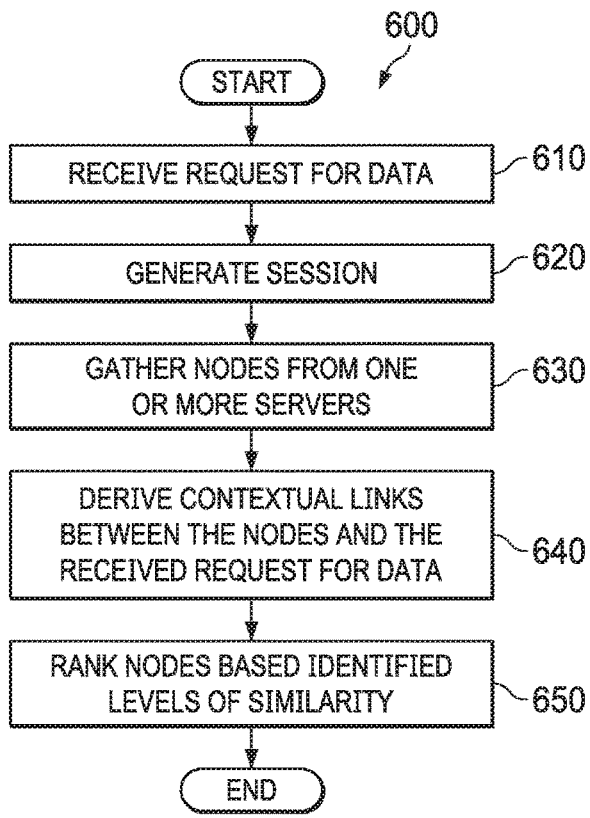
FIG. 6 illustrates another example process for data retrieval in accordance with embodiments of the present disclosure.

FIG. 6 illustrates another example process 600 for data retrieval in accordance with embodiments of the present disclosure. The process 600 does not limit the scope of this disclosure to any particular embodiments. While the process 600 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the steps of the process 600 are described with respect to query server 340 of FIGS. 3A and 3B.

At step 610 the query server 340 receives a query from a user. The query can be received from computing device 310 of FIG. 3A. In certain embodiments, the computing device 310 that transmits the query to the query server 340 is compatible with the OPC UA platform. In certain embodiments, the computing device 310 that transmits the query to the query server 340 is not compatible with the OPC UA platform. The received query requests information that is associated with the industrial plant, such information associated with the process control and automation system 100 of FIG. 1, the industrial plant 320 of FIG. 3A, or both. In certain embodiments, the received input is in the form of a natural language voice input from a user.

At step 620 the query server 340 generates a session with the computing device that transmitted the request. In certain embodiments, if a session currently exists between the computing device and the query server 340, the previous session can be utilized again. In certain embodiments, a new session is created for each subsequent query received from the same computing device. The session provides a communication pathway between the computing device and the OPC UA environment via the query server 340. For example, if the computing device is associated with a user with a certain authorization level, the authorization level of the user is passed to the query server when the session is generated. The authorization level indicates the views and the nodes that are available for the particular user.

In step 630 the query server 340 gathers the nodes from the one or more servers. In certain embodiments the query server aggregates nodes from one or more servers that are associated with the industrial plant. Each sever can be associated with the industrial plant. Each node that is gathered includes data that is associated with a particular feature of the industrial plant. In certain embodiments, the query server identifies each of the one or more servers that are associated with the industrial plant. The query server can then aggregate the identified one or more servers to gather the nodes that are associated with each server. The query server can then select particular nodes from the aggregated servers that the user is authorized to access. For example, when the session is generated, authorization information can be exchanged between the computing device and the query server. In another example, the authorization information can be exchanged when the query server aggregates the one or more servers. The authorization information indicates the particular nodes accessible to the user of the computing device. For example, the authorization information can include identification information of the user. The identification information of the user can initiate the particular views, such as views 372a-372n that the user has access too. The corresponding nodes within each view that is accessible to the user can be gathered.

When the nodes are gathered a cache of the nodes can be generated. In certain embodiments, the cache includes only the selected nodes that the user has access to. In certain embodiments, the cache includes all of the nodes from the one or more servers. The query server 340 can then convert the cache of nodes into individual files, where each file includes semantic constructs associated with each node. For example, if there are ten nodes, then there are two files. Each of the files can include semantic constructs associated with the respective node. The semantic constructs can include the data associated with the node and the relationship the particular node has with other nodes within the industrial plant.

In step 640, the query server 340 derives contextual links between the nodes and the received request for data. The contextual links identify various levels of similarity between the corpus of nodes and the received query. For example, a latent semantic analysis can be performed to identify similarities between nodes and the received query. In another example, the query server 340 can generate a matrix that includes the individual files of the semantic constructs. A cosine similarity analysis can be performed between the matrix and the received request in order to identify various links between the two. In certain embodiments, more contextual links that are found between a particular node and the received query can indicate a higher level of similarly. Whereas, if there are no contextual links that relate a particular node to the received query, this can indicate a low level of similarity between the two.

In step 650 the query server 340 ranks the nodes based on the identified levels of similarity. The highest ranked nodes will include the most contextual links between each node and the received query. In certain embodiments, the query server 340 can provide a listing of the highest ranked nodes to the computing device. For example, the query server 340 can transmit the address space for the particular nodes with the highest ranked level of similarity. The query server can retrieve the value (or values) associated with the highest ranked node (or nodes) and transmit the values to the computing device. If the query server 340 transmits the retrieved data associate with the ranked nodes the query server 340 can also include the rankings associated with each value that was retrieved. In certain embodiments, the query server 340 returns a preset number of nodes or values to the computing device. In certain embodiments, the query server 340 can transmit any number of the ranked nodes including the nodes respective rating to the computing device. Once the results of the query and transmitted to the computing device, the computing device is then able to either select a node and retrieve the data manually from the OPC UA server, or view the retrieved data that the query server transmitted without having to manually look up the value. In certain embodiments, a similar query is performed in a plant similar to the industrial plant 320 of FIG. 3A. For example, an operator or an engineer that is performing a site configuration can generate a query to look up a process tag.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for data retrieval, the method comprising:
receiving a request, from a computing device, for data associated with an industrial plant;
generating a session with the computing device;
gathering nodes from one or more servers associated with the industrial plant, wherein each of the nodes includes data associated with a particular feature of the industrial plant, wherein gathering the nodes comprises:
selecting one or more nodes from the gathered nodes, wherein selecting each of the one or more nodes is based on authorization information received from the generated session with the computing device and address space views from the generated session, wherein the authorization information indicates the nodes accessible to the computing device;

generating a contextual cache of the selected one or more nodes;

converting the generated contextual cache of the one or more nodes into individual files, wherein each file includes semantic constructs associated with each of the nodes;

processing the semantic constructs associated with each of the one or more nodes to remove noise;

generating a term frequency inverse document frequency matrix by transforming the processed semantic constructs from the individual files;

performing a cosine similarly analysis between the matrix and the received request for data;

deriving contextual links between the nodes and the received request for data to identify levels of similarity between the nodes and the request for data; and ranking the nodes based on the identified levels of similarity.

2. The method of claim 1, further comprising:

in response to ranking the nodes, retrieving the data that is associated with a highest ranked node from the particular feature of the industrial plant; and transmitting the retrieved data to the computing device.

3. The method of claim 1, wherein gathering the nodes comprises:

identifying the one or more servers associated with the industrial plant;

aggregating address-spaces of the identified one or more servers to gather the nodes that are associated with each of the one or more servers; and selecting particular nodes from the aggregated address-spaces of the one or more servers, wherein selecting each of the particular nodes is based on authorization information received from the generated session with the computing device, wherein the authorization information indicates the particular nodes accessible to the computing device.

4. The method of claim 1, wherein each of the nodes communicates though Open Platform Communications (OPC) Unified Architecture (UA) transport encoding.

5. The method of claim 4, wherein the each of the nodes is one of: a data access node, a history access node and an alarm and condition node.

6. The method of claim 1, wherein deriving contextual links between the nodes and the received request for data comprises performing a latent semantic analysis.

7. The method of claim 1, wherein the received request for data is a natural language voice input.

8. The method of claim 1, wherein:

each of the nodes communicates though Open Platform Communications (OPC) Unified Architecture (UA) transport encoding, and the each of the nodes is one of a data access node, a history access node or an alarm and condition node.

9. An electronic device for data retrieval, the electronic device comprising:

a communication unit configured to communicate with one or more server and a computing device; and a processor operably connected to the communication unit, wherein the processor is configured to:

receive a request, from the computing device, for data associated with an industrial plant;

generate a session with the computing device;

gather nodes from one or more servers associated with the industrial plant, wherein each of the nodes includes data associated a particular feature of the industrial plant, wherein gathering the nodes comprises:

select one or more nodes from the gathered nodes, wherein selecting each of the one or more nodes is based on authorization information received from the generated session with the computing device and address space views from the generated session, wherein the authorization information indicates the nodes accessible to the computing device;

generate a contextual cache of the selected one or more nodes;

convert the generated contextual cache of the one or more nodes into individual files, wherein each file include semantic constructs associated with each of the nodes;

process the semantic constructs associated with each of the one or more nodes to remove noise;

generate a term frequency inverse document frequency matrix by transforming the processed semantic constructs from the individual files;

perform a cosine similarly analysis between the matrix and the received request for data;

derive contextual links between the nodes and the received request for data to identify levels of similarity between the nodes and the request for data; and rank the nodes based on the identified levels of similarity.

10. The electronic device of claim 9, wherein the processor is further configured to:

in response to ranking the nodes, retrieve the data that is associated with a highest ranked node from the particular feature of the industrial plant; and transmit the retrieved data to the computing device.

11. The electronic device of claim 9, wherein to gathering the nodes, the processor is further configured to:

identify the one or more servers associated with the industrial plant;

aggregate address-spaces of the one or more servers to gather the nodes that are associated with each of the one or more servers; and select particular nodes from the aggregated address-spaces of the one or more servers, wherein selecting each of the particular nodes is based on authorization information received from the generated session with the computing device, wherein the authorization information indicates the particular nodes accessible to the computing device.

12. The electronic device of claim 9, wherein each of the nodes communicates though Open Platform Communications (OPC) Unified Architecture (UA) transport encodings.

13. The electronic device of claim 12, wherein the each of the nodes is one of: a data access node, a history access node and an alarm and condition node.

14. The electronic device of claim 9, wherein to derive contextual links between the nodes and the received request for data the processor is further configured to perform a latent semantic analysis.

15. The electronic device of claim 9, wherein the received request for data is a natural language voice input.

16. The electronic device of claim 9, wherein:

each of the nodes communicates though Open Platform Communications (OPC) Unified Architecture (UA) transport encodings, and the each of the nodes is one of: a data access node, a history access node or an alarm and condition node.

17. A non-transitory computer readable medium embodying a computer program, the computer program comprising computer readable program code that when executed by a processor of an electronic device causes the processor to:

receive a request, from a computing device, for data associated with an industrial plant;

generate a session with the computing device;

gather nodes from one or more servers associated with the industrial plant, wherein each of the nodes includes data associated a particular feature of the industrial plant wherein to gather the nodes, the computer readable medium further comprises program code that, when executed at the processor, causes the processor to:

select one or more nodes from the gathered nodes, wherein selecting each of the one or more nodes is based on authorization information received from the generated session with the computing device and address space views from the generated session, wherein the authorization information indicates the nodes accessible to the computing device;

generate a contextual cache of the selected one or more nodes;

convert the generated contextual cache of the one or more nodes into individual files, wherein each file include semantic constructs associated with each of the nodes;

process the semantic constructs associated with each of the one or more nodes to remove noise;

generate a term frequency inverse document frequency matrix by transforming the processed semantic constructs from the individual files; and perform a cosine similarly analysis between the matrix and the received request for data;

derive contextual links between the nodes and the received request for data to identify levels of similarity between the nodes and the request for data; and rank the nodes based on the identified levels of similarity.

18. The non-transitory computer readable medium of claim 17, wherein to gather the nodes, the computer readable medium further comprises program code that, when executed at the processor, causes the processor to:

identify the one or more servers associated with the industrial plant;

aggregate address-spaces of the one or more servers to gather the nodes that are associated with each of the one or more servers; and select particular nodes from the aggregated address-spaces of the one or more servers, wherein selecting each of the particular nodes is based on authorization information received from the generated session with the computing device, wherein the authorization information indicates the particular nodes accessible to the computing device.

19. The non-transitory computer readable medium of claim 17, wherein:

each of the nodes communicates though Open Platform Communications (OPC) Unified Architecture (UA) transport encodings, and the each of the nodes is one of: a data access node, a history access node and an alarm and condition node.

20. The non-transitory computer readable medium of claim 17, wherein to deriving contextual links between the nodes and the received request for data, the computer readable medium further comprises program code that, when executed at the processor, causes the processor to perform a latent semantic analysis.

* * * * *